United States Patent [19]
Garay et al.

[11] Patent Number: 5,315,957
[45] Date of Patent: May 31, 1994

[54] AVIAN PERCH

[76] Inventors: Robert J. Garay, 455 Fontanelle Dr., San Jose, Calif. 95111; Bert W. Stewart, 12581 Clayton Rd., San Jose, Calif. 95127

[21] Appl. No.: 855,525

[22] Filed: Mar. 23, 1992

[51] Int. Cl.$^5$ .............................................. A01K 31/12
[52] U.S. Cl. .................................... 119/26; 24/122.6; 24/135 N
[58] Field of Search ........................ 119/24, 25, 26, 29; 24/298, 302, 128, 18, 122.6, 115 R, 135 N; 57/200, 243, 256, 31

[56] References Cited

U.S. PATENT DOCUMENTS

| | | | |
|---|---|---|---|
| 1,192,441 | 7/1916 | Lydecker | 119/26 |
| 3,570,074 | 3/1971 | Schimmeyer et al. | 24/122.6 |
| 5,067,440 | 11/1991 | Hatten et al. | 119/29 |
| 5,099,796 | 3/1992 | Morgan | 119/26 |

FOREIGN PATENT DOCUMENTS 79757  2/1895  Fed. Rep. of Germany ........ 119/26

OTHER PUBLICATIONS

*Dura Pro* TM *Products,* "Jungle Vines TM ", 4 page brochure Mar. 1990.

*Primary Examiner*—Gene Mancene
*Assistant Examiner*—Todd E. Manahan
*Attorney, Agent, or Firm*—Fliesler, Dubb, Meyer & Lovejoy

[57]  ABSTRACT

An avian perch for mounting in a bird cage having a plurality of bars comprises a length of natural fiber non-cotton rope and mounting hardware usable with any rope perch. The mounting hardware comprises a first and second end cap with a bolt extending therefrom, a pair of washers and a wing nut for attaching each end of the perch to the bars of a bird cage.

12 Claims, 1 Drawing Sheet

AVIAN PERCH

BACKGROUND OF THE INVENTION

1. Field of the Invention

The present invention relates to articles of manufacture for the use and entertainment of birds in general and in particular to a natural fiber rope perch for use by birds of all kinds.

2. Description of the Related Art

Currently most perches found in bird cages are manufactured from processed wood rods, natural wood limbs, plastic or cotton rope. Birds, particularly larger birds such as parrots, macaws, etc., are well known for their destructive nature and routinely destroy the typical perch described above.

While each of the above-described perches lack one or more of the advantages of a natural fiber rope, such as sisal as discussed below, cotton rope perches can be particularly troublesome. It has been found that the strands in a cotton rope are typically quite long and difficult to break. As a result birds, particularly those that enjoy preening the cotton fibers, are known to have become tangled in the frayed masses of the cotton fibers, have become frightened and in a frenzy have broken a leg or a wing. Accordingly, such perches must be replaced periodically for health reasons and perch structural integrity.

SUMMARY OF THE INVENTION

For the foregoing reasons, a principal object of the present invention is a natural fiber non-cotton rope avian perch which offers benefits not found in current commercially available avian perches.

Other objects of the present invention are a method and apparatus comprising unique hardware for mounting a rope perch of any material to a cage.

In accordance with the above objects there is provided an avian perch comprising a length of natural, untreated sisal rope as the principal perching surface with unique mounting hardware located on both ends.

Referring to the perch material, to accommodate different sized cages and birds, the rope perch is typically pre-cut to different lengths, e.g. 18 in. to 36 in. and is made available in different diameters, e.g. 0.75 in. to 1.25 in. To facilitate sales, each perch is individually packaged for freshness in an airtight acrylic tube container.

The perch of the present invention as described above is superior to most common perches for the following reasons:

1. The surface of the perch comprising three strand sisal rope is intentionally irregular due to the twisting of all three strands throughout its length. This uneven surface offers constant change in the grip exerted by the bird thus preventing long term "static" perching. "Bumblefoot", a common ailment associated with long-term perching is overcome by the varying densities of the natural fiber rope.

An additional benefit of the surface is that the natural semi-rough surface of the sisal rope acts as a mild abrasive allowing skin to remain fresh and invigorated.

2. The perch is versatile in that it can be positioned in a variety of linear and non-linear layouts. For example, by twisting the rope and thereafter fastening the ends tightly to the cage, the perch can be made to assume a wave-like and other shapes. The tension exerted on the sisal by the fasteners will determine in what position the rope will remain. The perch is currently being recommended for use with babies who are beginning to walk. By using an oversized perch, e.g. a 24 in. perch in an 18 in. wide cage, the excess can be allowed to remain pendulous in the center, yet remain firm enough to support babies as they practice walking on the perch. The perch can also be angled for added exercise and multiple perches can be easily attached for multi-level effects.

3. The perch is safe. Sisal, the principal perching surface of the perch, is made of all natural plant matter with no added insecticides, fungicides and/or color dyes, as found in similar rope perches made of cotton. The sisal strands are generally short in length and will not tangle as does cotton. This is very important as birds pick and fray the perch. Sisal is also beneficial with respect to adverse environmental conditions. The natural rope fibers remains comfortable regardless of the ambient temperature.

4. Sisal, as the principal perching surface in the perch of the present invention, also has a therapeutic value. The fibrous strands provide hours of entertainment by allowing the bird to pull and preen the sisal strands. This feature has a hidden benefit. Due in part to nervous energy, boredom or stress some birds become feather pluckers. This is a condition where birds literally pull out all their feathers. If left untreated this condition can prove fatal. The sisal perch of the present invention is found to serve as a "pacifier" distraction, substituting sisal strands for feathers.

Referring to the mounting hardware which is usable with any type of rope perch, each end of the rope perch is fitted with a polyvinylchloride (PVC) end cap. A threaded bolt is slipped through a hole provided therefor in the end of the cap and the head thereof captured in the cap by inserting the end of the perch material in the cap as far as it will go and securing it therein as by a hotmelt adhesive. A pair of washers and a wing nut threaded on the bolt are then provided for attaching the perch to the bars of a cage.

BRIEF DESCRIPTION OF THE DRAWINGS

The above and other objects, features and advantages of the present invention will become apparent from the following detailed description of the accompanying drawings, in which.

DESCRIPTION OF THE PREFERRED EMBODIMENT

Referring to FIGS. 1-4, there is provided in accordance with the present invention an avian perch designated generally as 1. Perch 1 is mounted between vertical bars 2,3 of a bird cage designated generally as 4.

Perch 1 comprises five components and a government approved non-toxic hotmelt adhesive having a high tensile strength which is available from 3M under the trade mark Jet-melt, Model No. 3764-Q8.

Figure 1:
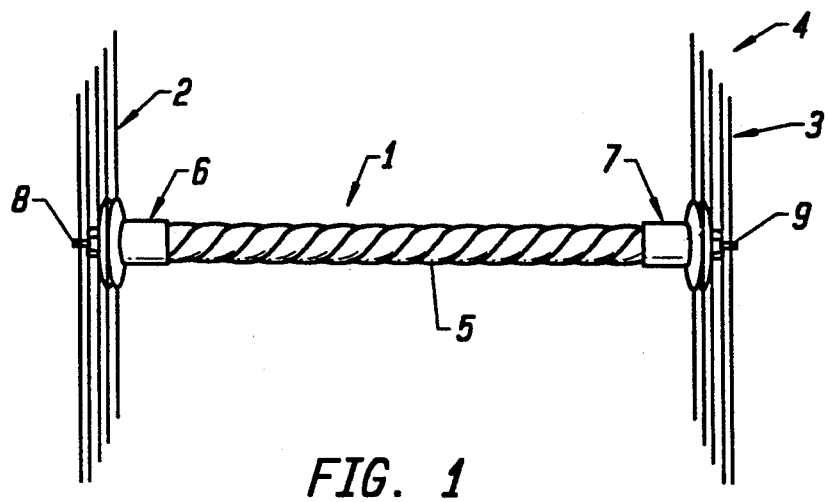
FIG. 1 is an elevation view of an avian perch according to the present invention.
Figure 2:
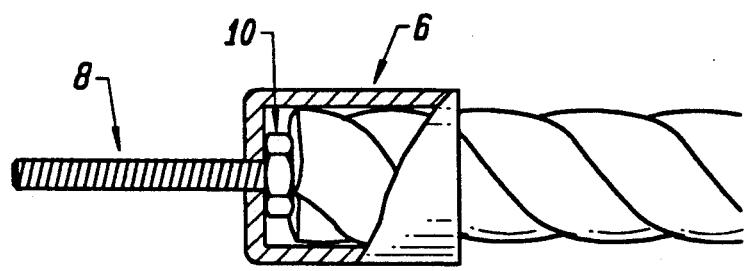
FIG. 2 is a partial cross-sectional view of one end of the perch of FIG. 1.
Figures 3, 4:
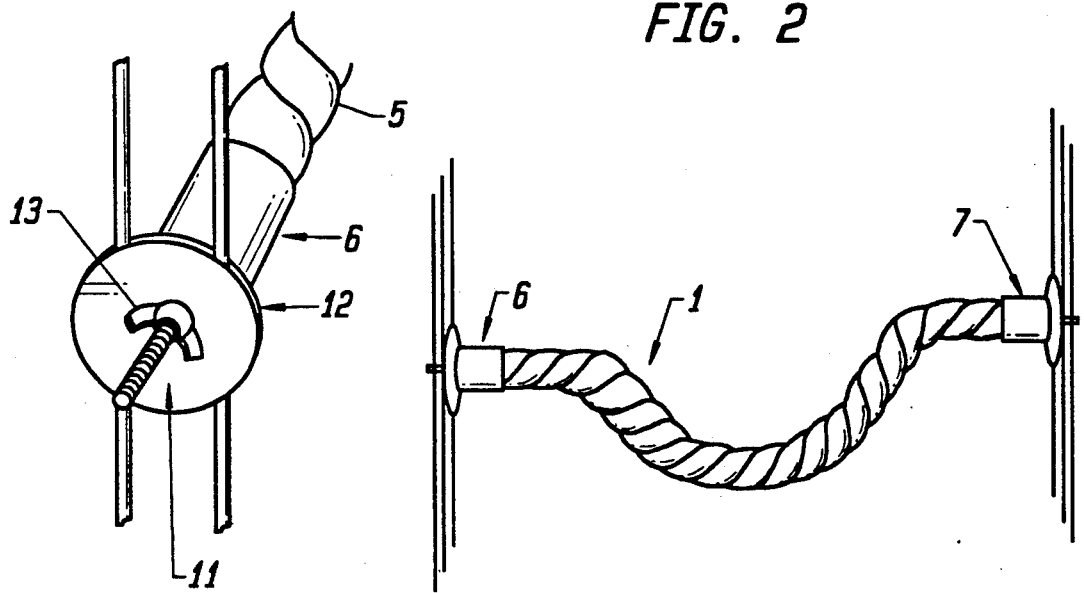
FIG. 3 is an end view of one end of the perch of FIG. 1.
FIG. 4 is another elevation view of an avian perch according to the present invention.

In the perch 1 there is provided a length of natural fiber rope 5, e.g. 18 in. to 36 in. long and 0.75 in. to 1.25 in. in diameter, such as sisal which is manufactured from dried plant material using no insecticides, fungicides or color dyes. Currently, rope of this type can be and is imported from Brazil. Each end of the rope 5 is terminated, respectively, by a pair of polyvinylchloride (PVC) end caps 6,7, such as commonly found in plumbing supply stores, having an interior diameter sufficient to receive the ends of the rope 5. Extending respectively from the end of each of the caps 6,7 through a hole provided therefor there is a pair of threaded bolts 8,9 having a head 10, as seen in FIG. 2. For example, the bolts 8,9 may comprise standard bolts with U.S. threads, such as 2 in. × ¼ in. bolts. A pair of washers 11, 12 having a diameter of approximately 2½ in. and a central hole ¼ in. in diameter is provided on each of the bolts 8,9 and held there as by a wing nut 13.

To fabricate the perch 1, a supply of natural sisal fiber rope having a selected diameter is cut to a predetermined length. The end caps 6,7 are then drilled to allow the bolts 8,9 to be slipped through only as far as the head 10. The bolts 6,7 serve as an anchor for the washers 11, 12 and wing nut 13. The hotmelt described above is applied to the inside of the cap with the bolt in place. The ends of the sisal rope are then inserted and seated as far into the cap as possible. The hotmelt then secures the sisal, end cap and bolt together. After processing both ends of the rope, the perch is allowed to cure, checked for tensile strength and packaged.

While a preferred embodiment of the present invention is described above, it is contemplated that numerous modifications may be made thereto for particular applications without departing from the spirit and scope of the present invention. For example, other means such as smaller bolts and washers may be used for attaching the perch 1 to the bars of a bird cage, particularly with respect to the smaller sized perches. Also, the bolts and washers may be replaced by elastic members terminated by clips adapted to be fastened to the bars. Accordingly, it is intended that the embodiments described be considered only as illustrative of the present invention and that the scope thereof should not be limited thereto but be determined by reference to the claims hereinafter provided.

What is claimed is:

1. An avian perch for mounting in a bird cage having a plurality of bars comprising:
   a length of exposed natural fiber non-cotton rope; and
   first and second means for attaching respective first and second ends of the rope to the bars of the bird cage wherein each of said first and second attaching means comprises:
   a first and a second member for capturing at least one of said plurality of bars therebetween; and
   means for tightening said first and said second members together with said one of said plurality of bars being captured therebetween.

2. An avian perch according to claim 1 wherein said first and said second members comprise washer-shaped members.

3. An avian perch according to claim 1 wherein said natural fiber rope comprises sisal.

4. A method of making an avian perch for use in a bird cage having bars comprising the steps of:
   cutting from a supply thereof a predetermined length of uncovered and exposed twisted multi-strand natural untreated non-cotton fiber rope; and
   mounting on each end of said predetermined length of said rope a fitting which comprises first and second means for capturing the bars of the bird cage therebetween.

5. An avian perch for mounting in a bird cage having a plurality of bars comprising:
   a length of natural fiber non-cotton rope; and
   first and second means for attaching respective first and second ends of the rope to the bars of the bird cage wherein each of said first and second attaching means comprises:
   a cap member having a bolt receiving hole in an end thereof;
   a threaded bolt which projects through the bolt receiving hole in the cap member with the head of said bolt abutting an interior wall of the end of the cap member;
   means for attaching the cap member to an end of the rope with the head of the bolt being captured between the interior wall of the end of the cap member and the end of the rope;
   a first and a second washer, each of the washers having a central bolt receiving hole for allowing the washer to be placed on the bolt; and
   a fastening means for engaging the bolt and tightly capturing one or more bars of the bird cage between the first and second washers.

6. An avian perch according to claim 5 wherein said means for attaching the cap member to an end of the rope with the head of the bolt being captured between the interior wall of the end of the cap member and the end of the rope comprises an adhesive.

7. An avian perch according to claim 6 wherein said adhesive comprises a hot melt adhesive.

8. An avian perch according to claim 5 wherein said fastening means for engaging the bolt and tightly capturing one or more bars of the bird cage between the first and second washers comprises a threaded wingnut.

9. Mounting hardware for mounting an end of a rope in an avian rope perch in a bird cage comprising:
   a cap member having a bolt receiving hole in an end thereof;
   a threaded bolt which projects through the bolt receiving hole in the cap member with the head of said bolt abutting an interior wall of the end of the cap member;
   means for attaching the cap member to an end of the rope in the rope perch with the head of the bolt being captured between the interior wall of the end of the cap member and the end of the rope;
   a first and a second washer, each of the washers having a central bolt receiving hole for allowing the washer to be placed on the bolt; and
   a fastening means for engaging the bolt and tightly capturing one or more bars of the bird cage between the first and second washers.

10. Mounting hardware for an avian perch according to claim 9 wherein said means for attaching the cap member to an end of the rope with the head of the bolt being captured between the interior wall of the end of the cap member and the end of the rope comprises an adhesive.

11. Mounting hardware for an avian perch according to claim 10 wherein said adhesive comprises a hot melt adhesive.

12. Mounting hardware for an avian perch according to claim 9 wherein said fastening means for engaging the bolt and tightly capturing one or more bars of the bird cage between the first and second washers comprises a threaded wingnut.

* * * * *